(12) United States Patent
Leiter

(10) Patent No.: US 8,007,055 B2
(45) Date of Patent: Aug. 30, 2011

(54) ELECTRONIC SYSTEM FOR OPERATING AN ELECTROMECHANICAL PARKING BRAKE

(75) Inventor: Ralf Leiter, Mendig (DE)

(73) Assignee: Lucas Automotive Gmbh, Koblenz (DE)

( * ) Notice: Subject to any disclaimer, the term of this patent is extended or adjusted under 35 U.S.C. 154(b) by 0 days.

(21) Appl. No.: 12/747,257

(22) PCT Filed: Dec. 3, 2008

(86) PCT No.: PCT/EP2008/010235
§ 371 (c)(1),
(2), (4) Date: Jul. 27, 2010

(87) PCT Pub. No.: WO2009/074252
PCT Pub. Date: Jun. 18, 2009

(65) Prior Publication Data
US 2010/0314934 A1    Dec. 16, 2010

(30) Foreign Application Priority Data
Dec. 12, 2007 (DE) .......................... 10 2007 059 684

(51) Int. Cl.
*B60T 8/88* (2006.01)
(52) U.S. Cl. .................. 303/122.03; 701/70; 701/78
(58) Field of Classification Search .............. 701/70, 701/76, 78; 303/122.03; 318/362, 370; 188/162
See application file for complete search history.

(56) References Cited

U.S. PATENT DOCUMENTS

| | | |
|---|---|---|
| 5,952,799 A | 9/1999 | Maisch et al. |
| 5,961,190 A | 10/1999 | Brandmeier et al. |
| 6,249,737 B1 * | 6/2001 | Zipp ................................ 701/70 |
| 6,256,570 B1 * | 7/2001 | Weiberle et al. ................. 701/70 |
| 6,317,675 B1 | 11/2001 | Stölzl et al. |
| 6,663,195 B1 * | 12/2003 | Arnold ..................... 303/122.03 |
| 2003/0006726 A1 | 1/2003 | Weiberle et al. |
| 2008/0105502 A1 | 5/2008 | Koth et al. |
| 2009/0200124 A1 | 8/2009 | Heise |

FOREIGN PATENT DOCUMENTS

| | | |
|---|---|---|
| DE | 19634567 A1 | 3/1998 |
| DE | 19751431 A1 | 7/1999 |
| DE | 19758289 A1 | 7/1999 |
| DE | 10118262 A1 | 10/2002 |
| DE | 102007029632 A1 | 1/2008 |

(Continued)

*Primary Examiner* — Christopher P Schwartz
(74) *Attorney, Agent, or Firm* — MacMillian, Sobanski & Todd, LLC

(57) ABSTRACT

An electronic system to operate an electromechanical parking brake for a land vehicle comprises at least one input unit to detect a driver request for parking brake and at least two control units in connection with the input unit to evaluate the driver request for parking brake transmitted thereto. The control units are in connection with at least one actuator for activating the parking brake, in order to control said actuator. In addition, the system comprises an energy supply to feed the input unit, and the control units of the at least one actuator. On occurrence of a single fault from a set of possible fault states in the system, at least one control unit and at least one actuator are supplied with energy and/or control signals, the at least one control unit supplied controls the at least one actuator supplied so that the land vehicle is fixed in a parked position when a corresponding driver request for parking brake is present.

11 Claims, 6 Drawing Sheets

FOREIGN PATENT DOCUMENTS

| | | |
|---|---|---|
| DE | 19653541 B4 | 7/2009 |
| EP | 0780276 A2 | 6/1997 |
| WO | 9926821 A1 | 6/1999 |
| WO | 0029268 A1 | 5/2000 |
| WO | 2006061238 A1 | 6/2006 |

* cited by examiner

System 1b

—————— Power
............ HS-CAN
– – – – Privat-CAN

System 2

System 3

— Power
........ HS-CAN
– – – Privat-CAN

System 4

— Power
······ HS-CAN
- - - Privat-CAN

System 5

——————— Power
················ HS-CAN
— — — Privat-CAN

ELECTRONIC SYSTEM FOR OPERATING AN ELECTROMECHANICAL PARKING BRAKE

CROSS-REFERENCE TO RELATED APPLICATIONS

This application is a national stage of International Application No. PCT/EP2008/010235 filed Dec. 3, 2008, the disclosures of which are incorporated herein by reference, and which claimed priority to German Patent Application No. 10 2007 059 684.9 filed Dec. 12, 2007, the disclosures of which are incorporated herein by reference.

BACKGROUND OF THE INVENTION

An electronic system to operate an electromechanical parking brake of a land vehicle is described, having an input unit to detect a driver request for parking brake, which request is evaluated by at least one control unit which controls at least one actuating unit for activating at least one brake.

DE 196 53 541 A1 discloses an electrically activatable actuating device for motor vehicle parking brakes. The actuating device comprises two electric motors which are controllable separately from one another for activating the brakes. Furthermore, the actuating device comprises a control unit for controlling the electric motors according to a driver request for braking. The two electric motors are contained in a common receiving housing and are axially displaceable in the housing in relation to the wheel axles of the motor vehicle. The motors act by means of a threaded spindle and a threaded nut on actuating elements of the brakes. One of the two electric motors is designed for regular activation of the brakes. The other of the two electric motors is activatable via an emergency switch for use in emergency operation. Activation of the parking brakes by one electric motor or the other is possible owing to the axial displaceability of the two electric motors relative to their receiving housing. The electric motor to be controlled in emergency operation is fed from a circuit which is independent of the power supply of the control unit and the electric motor for normal operation. Release and application of the brakes is thus possible even in the event of failure of one electric motor or one of the two power supplies.

An input unit to detect a driver request for parking brake for an electromechanical parking brake system is known from EP 1 128 999 B1. In this case, the input unit is in connection with an electronic control unit which for its part converts the signals, supplied from the input unit, directly into corresponding control signals for an actuating unit, in order to transform the parking brake system into the desired activation state. In order, even in the event of a fault, to enable detection of the driver request for parking brake with regard to an activation of the parking brake system, i.e. application or release, and at the same time a fault diagnosis, the input unit according to EP 1 128 999 B1 must be designed as a push-button or rocker switch with a plurality of switching positions and in each switching position supply at least two redundant signals to the electronic control unit.

A parking brake system for motor vehicles, having an operating element, two actuators with assigned control units and a redundant power supply, is known from DE 10 2007 029 632 A1, and corresponding US patent publication No. 2009/200124 A1, the US document being incorporated by reference herein. The parking brake system comprises four mutually independent signal lines for transmitting control signals, corresponding to a driver request, from the operating element to the actuators. A signal line is formed in each case between the operating element and the control unit of each actuator, between the two actuators themselves and directly between the operating element and the two actuators. Owing to this configuration, the parking brake system remains fully functional in the event of failure of individual components. Even in the event of a fault in one of the actuators, the other actuator remains fully functional independently thereof.

DE 197 51 431 A1 discloses an electromechanical parking brake system for motor vehicles, having a control device for controlling motor-activatable parking brakes and a redundant energy supply. For the redundant energy supply, the parking brake system has a reserve battery in addition to a main energy supply unit. The control device comprises a plurality of control units working in parallel for separate processing of input signals. Each of the control units is separately supplied with energy. Thus, it is still possible to activate one of the actuating motors for actuating at least one parking brake if an electrical fault occurs in one of the branches in the parking brake system.

A redundant energy supply of an electrical parking brake for motor vehicles is known from DE 197 58 289 A1. In the event of a main battery not being available, the electrical parking brake is fed by an auxiliary battery, the auxiliary battery being based on a technology different to the main battery and/or having a different loading profile to the main battery. For the switch-over process between the main and auxiliary battery, there is provided in the motor vehicle a switch-over means to uncouple the parking brake from the main battery and connect it to the auxiliary battery.

An electrical brake system, in which the energy supply of the elements contained in the brake system is effected by at least two independent on-board networks, is known from DE 196 34 567 A1, and corresponding U.S. Pat. No. 5,952,799 A, the US document being incorporated by reference herein. The brake system has control modules on the vehicle wheels for adjusting the braking force and a control module for detecting a driver request for braking. At least two independent information paths are provided between the modules, and at least one of the modules and one of the information paths are fed from a different on-board network to the other modules and information paths. In the event of a fault, control signals are supplied to the wheel control modules directly from a pedal unit which detects the driver request for braking, so that braking operation is ensured in one information path even in the event of a fault. The fault detection is effected by comparing signals supplied to the wheel control modules via the individual information paths. If the result of the comparison is inconsistent, a fault is present.

BRIEF SUMMARY OF THE INVENTION

The object of the electrical parking brake system on which this application is based is that the parking brake remains activatable on occurrence of a fault state in the electrical system, in order to fix the land vehicle in a parked position according to a driver request for parking brake, as long as at least part of the system supply with energy and control signals is ensured.

This object is achieved by an electrical parking brake system having the features of claim 1.

Starting from a known parking brake system according to the precharacterising part of claim 1, the claimed parking brake system having the features of the characterising part of claim 1 can fix the land vehicle in a parked position when a corresponding driver request for parking brake is present, despite the presence of a single fault from a set of possible fault states in the system.

As long as at least one control unit is supplied with energy and at least one actuator is supplied with energy and control signals, a driver request for parking brake can be fulfilled by the at least one control unit supplied controlling the at least one actuator in accordance with the driver request for parking brake. In this case, an actuator can be assigned to a brake cylinder of a vehicle wheel and activate said cylinder.

The electronic system to operate the electromechanical parking brake can comprise at least one input unit to detect the driver request for parking brake. This input unit can be in connection with at least two control units which evaluate the driver request for parking brake. The control units can in turn be in connection with at least one actuator which can activate the parking brake according to the driver request for parking brake.

The energy supply of the input unit, the control units and the at least one actuator can be ensured by two or more independent energy supply circuits which can each be fed from a voltage source.

The input unit can be in connection with the control units via a first bus system, in order to supply said control units with control signals.

The control units can be connected to the at least one actuator via a second bus system, in order to control said actuator for activating the parking brake in accordance with the driver request for parking brake.

The parking brake system can also comprise couplers. Said couplers can be arranged in at least one bus system and also in the energy supply circuits.

Furthermore, the two independent energy supply circuits can be united via a coupling branch. This coupling branch can comprise a coupler, in order to control the uniting and separation of the two energy supply circuits connected via the coupling branch.

The set of fault states possible in the system is defined below. This set comprises the following single faults:
failure of a voltage source, inter alia with short-circuit;
short-circuit in the coupling branch;
failure of the first bus system with interruption to a control unit;
failure of the first bus system with interruption to all control units;
failure of the first bus system with short-circuit;
failure of the second bus system with interruption to a control unit;
failure of the second bus system with short-circuit;
failure of a control unit;
failure of an actuator;

Other advantages of this invention will become apparent to those skilled in the art from the following detailed description of the preferred embodiments, when read in light of the accompanying drawings.

DETAILED DESCRIPTION OF THE INVENTION

Figure 1:
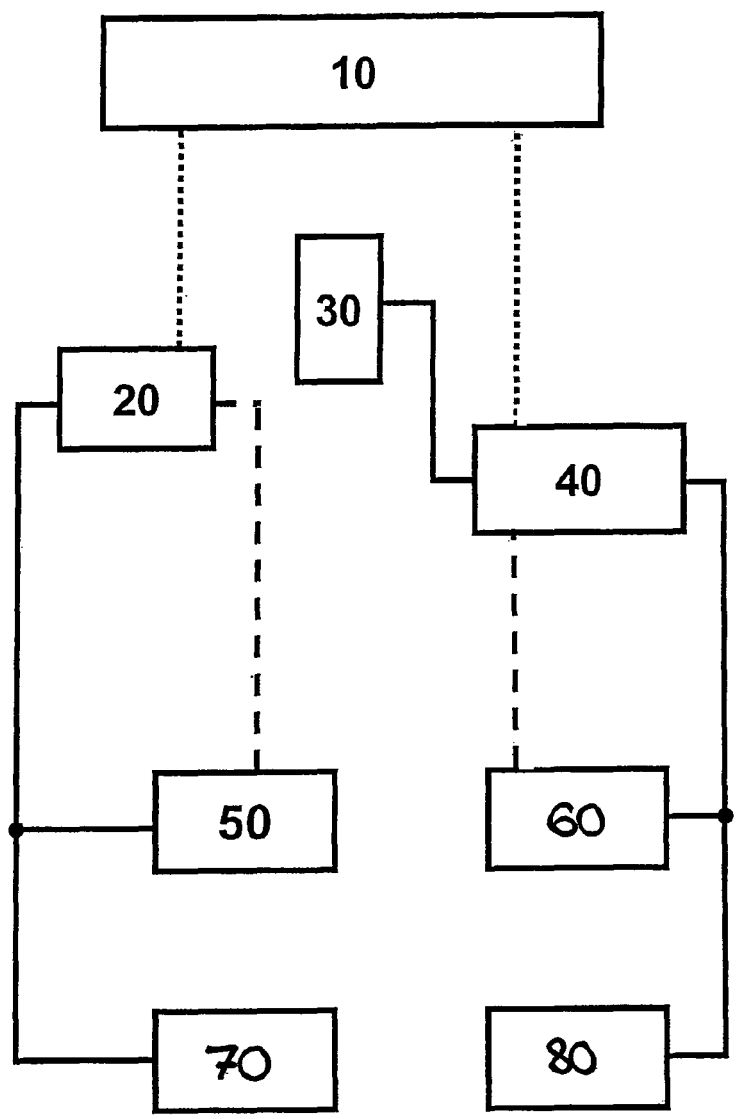
FIG. 1 shows a circuit diagram of a first embodiment of the electronic system.

FIG. 1 shows the circuit diagram of an electronic system 1a, comprising an input unit 10, three control units 20, 30, 40, two actuators 50, 60, and two independent energy supply circuits each fed from a voltage source 70, 80. The three control units 20, 30, 40 take the form of gearbox 20, smart switch 30 and electronic stability control (ESP) 40. The two actuators 50, 60 each activate a brake cylinder of a vehicle wheel.

The input unit 10 is in connection with the gearbox 20 and the ESP 40 via a bus system HS-CAN. The gearbox is connected to the left actuator 50 via a bus system Private-CAN and the ESP 40 is connected to the right actuator 60 via the bus system Private-CAN.

FIG. 1 comprises two voltage sources 70, 80, the left voltage source 70 feeding the left actuator 50 and the gearbox 20 and the right voltage source 80 supplying the right actuator 60, the ESP 40 and the smart switch 30 with energy.

Logic for activating the parking brake is present in the gearbox 20. This logic is called in via a position of a selector lever of the gearbox 20. The ESP 40 likewise comprises logic for controlling the parking brake.

If a driver request for parking brake is sent from the input unit 10 to the gearbox 20 and the ESP 40 via the bus system HS-CAN, the gearbox 20 controls the left actuator 50 so that the parking brake is activated in accordance with the driver request for parking brake, and the ESP 40 controls the right actuator 60 likewise.

If the parking brake is activated by one or both actuators 50, 60, one actuator 50, 60 or both are "applied". Thus, in fault-free system operation, both actuators 50, 60 are applied.

If a single fault is present, at least one actuator 50, 60 is still applied.

In the event of failure of the left voltage source 70, the gearbox 20 no longer receives any control signals via the bus system HS-CAN and/or the left actuator 50 no longer receives any control signals via the bus system Private-CAN. Since the right voltage source 80 still supplies the ESP 40 and the right actuator 60 with energy, the driver request for parking brake is sent from the input unit 10 to the ESP 40 via the bus system HS-CAN and the right actuator 60 is controlled via the bus system Private-CAN so that it is applied in accordance with the driver request for parking brake.

In the event of failure of the right voltage source 80, the ESP 40 no longer receives any control signals via the bus system HS-CAN and/or the right actuator 60 no longer receives any control signals via the bus system Private-CAN. Since, in this case, the left voltage source 80 still supplies the gearbox 20 and the left actuator 50 with energy, the driver request for parking brake is sent from the input unit 10 to the gearbox 20 via the bus system HS-CAN and the left actuator 50 is controlled via the bus system Private-CAN so that it is applied in accordance with the driver request for parking brake.

If a short-circuit is present in one of the two energy supply circuits, the system reaction is in accordance with the system reaction to one of the two single faults already described, a short-circuit in the left energy supply circuit causing the same system reaction as a failure of the left voltage source 70 and a short-circuit in the right energy supply circuit causing the same system reaction as a failure of the right voltage source 80.

If it is not possible to send control signals from the input unit 10 to the gearbox 20 via the bus system HS-CAN, the bus system HS-CAN is interrupted in this region; with the result that the ESP 40 controls the right actuator 60 in accordance with the driver request for parking brake, so that said actuator is applied.

If an interruption is present in the bus system HS-CAN between the input unit 10 and the ESP 40, this results in the gearbox 20 controlling the left actuator 50 in accordance with the driver request for parking brake, so that said actuator is applied.

If the bus system HS-CAN to the gearbox 20 and to the ESP 40 is interrupted, an actuator 50, 60 is nevertheless applied. This is effected either by the logic in the gearbox 20 or the logic in the ESP 40.

The same applies also in the event of failure of the bus system HS-CAN with a short-circuit.

If the single fault is a failure of the bus system connection Private-CAN between gearbox 20 and left actuator 50, the left actuator 50 no longer receives any control signals. Since the right actuator 60 is still in contact with the ESP 40 via the bus system connection Private-CAN, this actuator 60 is applied in accordance with the driver request for parking brake.

If, in contrast, the bus system connection Private-CAN between the ESP 40 and the right actuator 60 is interrupted, the left actuator 50 is applied in accordance with the control signals of the gearbox 20.

If a short-circuit is present in the bus system connection Private-CAN between gearbox 20 and left actuator 50, this single fault causes the same system reaction as the interruption of the bus system connection Private-CAN in this region.

In contrast, a short-circuit in the bus system connection Private-CAN between ESP 40 and right actuator 60 causes the same system reaction as the interruption of the bus system connection Private-CAN between the ESP 40 and the right actuator 60.

If the ESP 40 fails, the left actuator 50 is controlled via the gearbox 20 in accordance with the driver request for parking brake, so that said actuator is applied.

In the event of failure of the gearbox 20, in contrast, the right actuator 60 is applied in response to control signals of the ESP 40 in accordance with the driver request for parking brake.

If the failure of an actuator 50 or 60 is present, it is checked whether the failed actuator 50 or 60 is in the released state; in this state, the parking brake is not activated. If the actuator 50 or 60 is in the released state, it is no longer controlled. If, in contrast, the failed actuator 50 or 60 is applied, it is attempted, on each release command sent from the input unit 10 to the control unit 20 or 40 in connection with the failed actuator 50 or 60, to release the failed actuator 50 or 60. If, in contrast, the input unit 10 detects a driver request for parking brake, the actuator 50 or 60 which has not failed is controlled and thus applied via control signals of the assigned control unit 20 or 40 in accordance with the driver request for parking brake.

For all descriptions of the figures in this application, a control unit 20, 30, 40 is said to be assigned to an actuator 50, 60 when there is a bus system connection between the control unit 20, 30, 40 and the actuator 50, 60.

Figure 2:
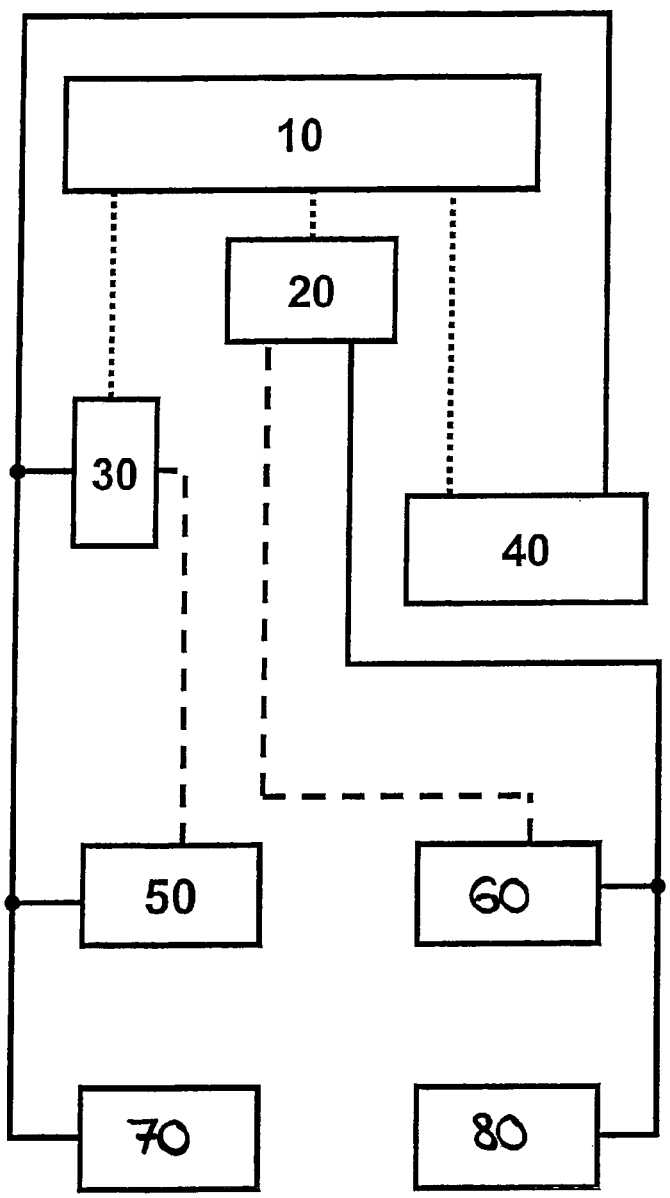
FIG. 2 shows a circuit diagram of a second embodiment of the electronic system.

FIG. 2 shows the circuit diagram of an electronic system 1b having substantially the same constituents and connections as the system 1a from FIG. 1. However, system 1b differs with regard to the bus system connections HS-CAN, Private-CAN, the function of the control units 40 and smart switch 30 and the energy supply of system 1a.

In FIG. 2 the input unit 10 is in connection via the bus system HS-CAN not only with the gearbox 20 and the ESP 40, but additionally with the smart switch 30. In system 1b, in contrast to system 1a, the right actuator 60 is controlled by the gearbox 20. For this purpose, the gearbox 20 is in connection with the right actuator 60 via the bus system Private-CAN. In this system, the smart switch 30 is in connection with the left actuator 50 via the bus system Private-CAN. The ESP 40, in contrast, no longer has a connection to one of the actuators 50, 60. Just as system 1a, system 1b comprises two independent energy supply circuits which are each fed from a voltage source 70, 80. The difference to system 1a lies in the fact that the smart switch 30, the ESP 40 and the left actuator 50 are supplied with energy from the left voltage source 70, and the gearbox 20 and the right actuator 60 are supplied with energy from the right voltage source 80.

Furthermore, system 1a from FIG. 1 differs from system 1b from FIG. 2 in that the logic for activating the parking brake by the left actuator 50 and thus for controlling the left actuator 50 is situated in the smart switch 30 and not in the ESP 40. Just as for system 1a, it is also ensured for system 1b that both actuators 50, 60 are applied in fault-free system operation.

If a single fault is present, at least one actuator 50, 60 is still applied in system 1b from FIG. 2 as well.

In the event of failure of the left voltage source 70, the smart switch 30 no longer receives any control signals via the bus system HS-CAN and/or the left actuator 50 no longer receives any control signals from the smart switch 30 via the bus system Private-CAN. Since the right voltage source 80 still supplies the gearbox 20 and the right actuator 60 with energy, the driver request for parking brake is sent from the input unit 10 to the gearbox 20 via the bus system HS-CAN and the right actuator 60 is controlled via the bus system Private-CAN so that it is applied in accordance with the driver request for parking brake.

In the event of failure of the right voltage source 80, the gearbox 20 no longer receives any control signals via the bus system HS-CAN and/or the right actuator 60 no longer receives any control signals via the bus system Private-CAN. Since, in this case, the left voltage source 80 still supplies the smart switch 30 and the left actuator 50 with energy, the driver request for parking brake is sent from the input unit 10 to the smart switch 30 via the bus system HS-CAN and the left actuator 50 is controlled via the bus system Private-CAN so that it is applied in accordance with the driver request for parking brake.

If a short-circuit is present in one of the two energy supply circuits, the system reaction is in accordance with the system reaction to one of the two single faults already described with regard to system 1b (FIG. 2), a short-circuit in the left energy supply circuit causing the same system reaction as in the event of failure of the left voltage source 70 and a short-circuit in the right energy supply circuit causing the same system reaction as in the event of failure of the right voltage source 80.

If it is not possible to send control signals from the input unit 10 to the gearbox 20 via the bus system HS-CAN, the bus system HS-CAN is interrupted in this region; with the result that the smart switch 30 controls the left actuator 50 in accordance with the driver request for parking brake, so that said actuator is applied.

If an interruption is present in the bus system HS-CAN between the input unit 10 and the smart switch 30, this results in the gearbox 20 controlling the right actuator 60 in accordance with the driver request for parking brake, so that said actuator is applied.

If the bus system HS-CAN to the gearbox 20 and to the smart switch 30 is interrupted, an actuator 50, 60 is nevertheless applied. This is effected either by the logic in the gearbox 20 or the logic device in the smart switch 30.

The same applies also in the event of failure of the bus system HS-CAN with a short-circuit.

If the single fault is a failure of the bus system connection Private-CAN between gearbox 20 and right actuator 60, the right actuator 60 no longer receives any control signals. Since the left actuator 50 is still in contact with the smart switch 30 via the bus system connection Private-CAN, this actuator 50 is applied in accordance with the driver request for parking brake.

If, in contrast, the bus system connection Private-CAN between the smart switch 30 and the left actuator 50 is interrupted, the right actuator 60 is applied in accordance with the control signals of the gearbox 20.

If a short-circuit is present in the bus system connection Private-CAN between gearbox 20 and right actuator 60, this single fault causes the same system reaction as the interruption of the bus system connection Private-CAN in this region.

In contrast, a short-circuit in the bus system connection Private-CAN between smart switch 30 and left actuator 50 causes the same system reaction as the interruption of the bus system connection Private-CAN between the smart switch 30 and the left actuator 50.

If the smart switch 30 fails, the right actuator 60 is controlled via the gearbox 20 in accordance with the driver request for parking brake, so that said actuator is applied.

In the event of failure of the gearbox 20, in contrast, the left actuator 50 is applied in response to control signals of the smart switch 30 in accordance with the driver request for parking brake.

If the failure of an actuator 50 or 60 is present, it is checked whether the failed actuator 50 or 60 is in the released state; in this state, the parking brake is not activated. If the actuator 50 or 60 is in the released state, it is no longer controlled. If, in contrast, the failed actuator 50 or 60 is applied, it is attempted, on each release command sent from the input unit 10 to the control unit 20, 30 or 40 in connection with the failed actuator 50 or 60, to release the failed actuator 50 or 60. If, in contrast, the input unit 10 detects a driver request for parking brake, the actuator 50 or 60 which has not failed is controlled and thus applied via control signals of the assigned control unit 20 or 30 in accordance with the driver request for parking brake.

Figure 3:
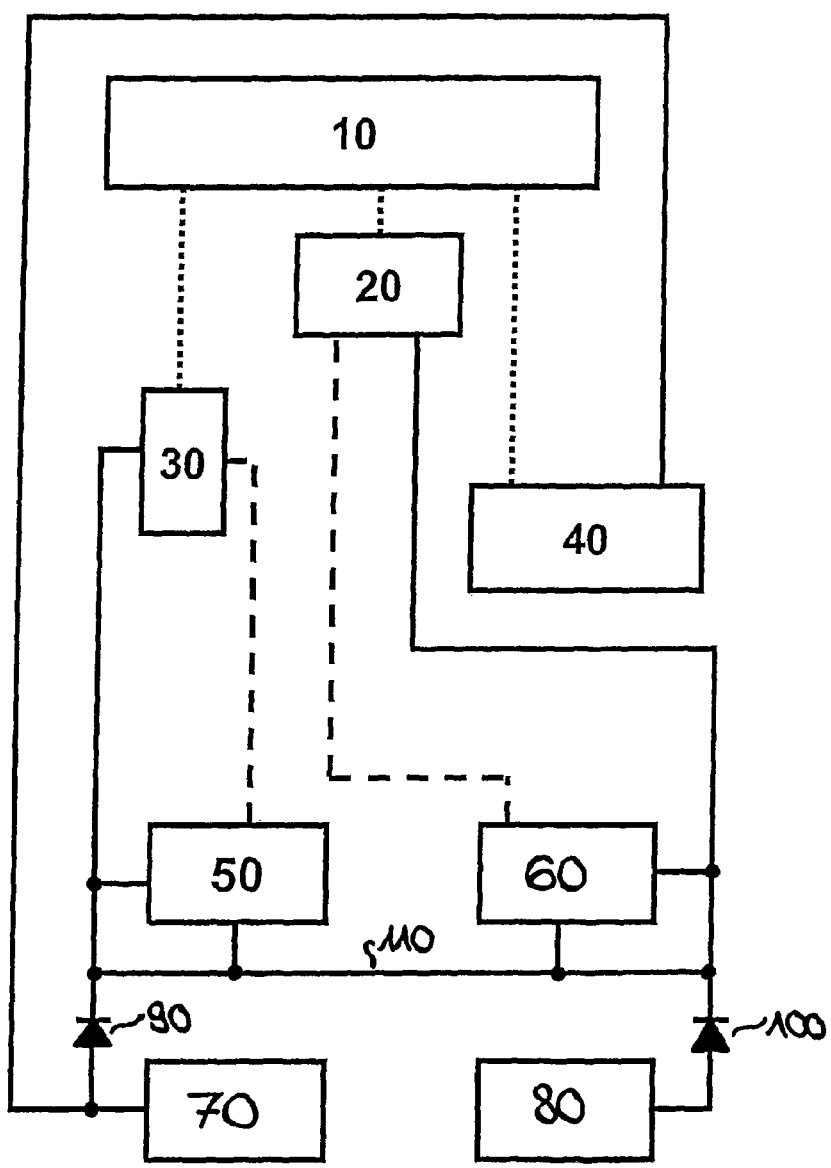
FIG. 3 shows a circuit diagram of a third embodiment of the electronic system.

FIG. 3 shows a circuit diagram of an electronic system 2. This circuit diagram corresponds substantially to the circuit diagram of system 1b from FIG. 2.

One difference lies in the fact that the two independent energy supply circuits are connected via a coupling branch 110 and thus become an energy supply circuit with two independent voltage sources 70, 80.

A further difference lies in the fact that a coupling diode 90 is connected between the left voltage source 70 and the left actuator 50 as well as the smart switch 30. Said diode lets through energy from the left voltage source 70 to the left actuator 50 and to the smart switch 30. The ESP 40 is supplied with energy directly from the left voltage source 70 without an interposed diode. Likewise, a coupling diode 100 is connected between the right voltage source 80 and the right actuator 60 as well as the gearbox 20. It lets through energy from the right voltage source 80 to the right actuator 60 and to the gearbox 20.

If a single fault is present in system 2, at least one actuator 50, 60 is still applied in all the single faults, except the short-circuit in the coupling branch.

In the event of failure of the left voltage source 70, the ESP 40 no longer receives any control signals from the input unit 10. Although the energy supply for both actuators 50, 60 as well as for the smart switch 30 and the gearbox 20 is ensured by the right voltage source, only the right actuator 60 is controlled by the gearbox 20 via the bus system Private-CAN so that it is applied in accordance with the driver request for parking brake.

In the event of failure of the right voltage source 80, the left voltage source 70 takes over the energy supply for the gearbox 20 and the right actuator 60. The left actuator 50 is controlled by the smart switch 30 via the bus system Private-CAN so that it is applied in accordance with the driver request for parking brake.

If a short-circuit is present in one of the two energy supply circuits connected to the coupling branch 110, the system reaction is in accordance with the system reaction to one of the two single faults already described, a short-circuit in the left energy supply circuit causing the same system reaction as in the event of failure of the left voltage source 70 and a short-circuit in the right energy supply circuit causing the same system reaction as in the case of failure of the right voltage source 80.

The single fault descriptions and system reactions which are still missing are analogous to the description of the faults for system 1b from FIG. 2 and are therefore not explicitly set out again.

Since system 2 (FIG. 3) comprises a coupling branch 110, the single fault "short-circuit in the coupling branch" is also significant for this system 2. If a short-circuit is thus present in the coupling branch 110, both actuators 50, 60 are no longer supplied with energy, no more control signals can be received and therefore both actuators 50, 60 cannot activate the parking brake. In the case of this fault, there is thus no longer any system reaction.

Figure 4:
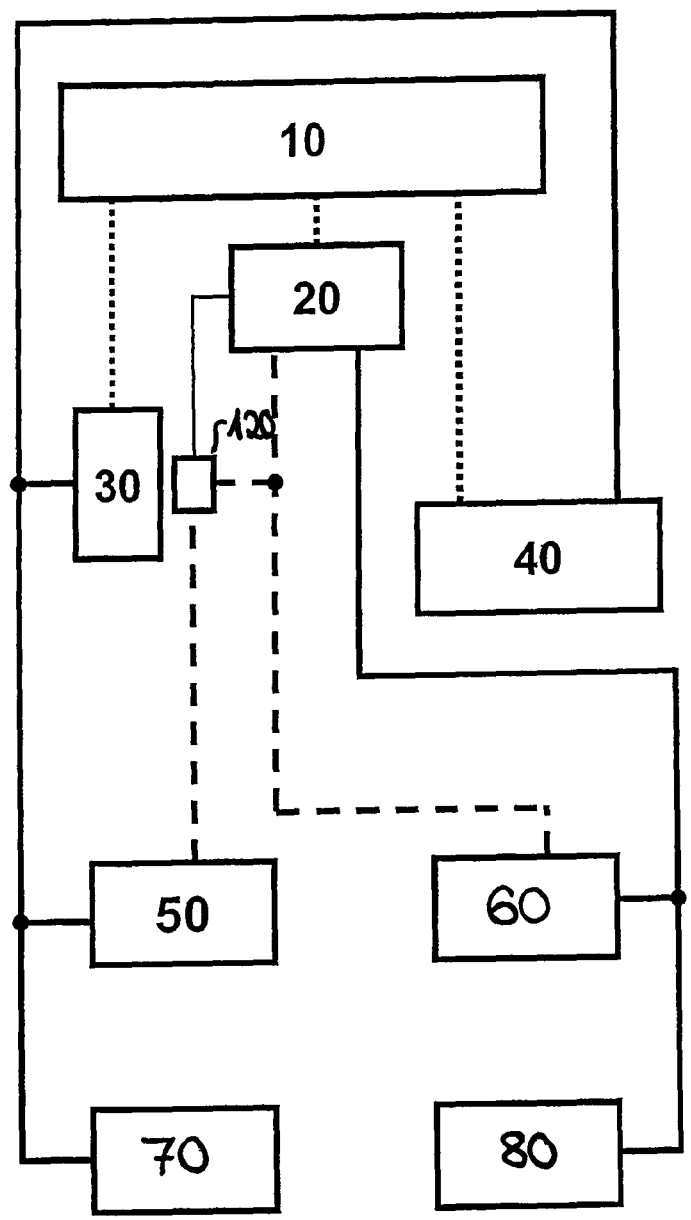
FIG. 4 shows a circuit diagram of a fourth embodiment of the electronic system.

FIG. 4 shows a circuit diagram of a system 3. The circuit diagram corresponds substantially to the circuit diagram with respect to system 1b from FIG. 2. The difference lies in the fact that the bus system connections Private-CAN between the smart switch 30 and the left actuator 50, as well as between the gearbox 20 and the right actuator 60, are connected via an additional bus system connection Private-CAN, this additional bus system connection Private-CAN comprising a coupling relay 120. The coupling relay 120 is controlled independently by the smart switch 30 and the gearbox 20.

The coupling relay 120 can be switched between two states, a closed state in which the additional bus system connection is used for transmitting control signals, and a blocked state in which the coupling relay 120 is open and no control signal transmission is possible via the additional bus system connection. Initially, the coupling relay 120 is open and thus the system 3 with blocked coupling relay 120 corresponds to the system 1b from FIG. 2.

In fault-free system operation and even in the event of failure of one of the control units smart switch 30 and gearbox 20 or in the event of failure of the bus system HS-CAN, both actuators 50, 60 can be applied.

If one of the other single faults from the set of fault states in the system 2 is present, at least one actuator 50, 60 is also applied in the system from FIG. 3.

In the event of failure of the left voltage source 70, the reaction of system 3 is analogous to the system reaction described for system 1b.

In the event of failure of the right voltage source 80, the reaction of system 3 is analogous to the system reaction described for system 1b. If the smart switch 30 controls the coupling relay 20 so that said relay closes, the right actuator 60 can be additionally applied if it still has sufficient energy.

If a short-circuit is present in one of the two energy supply circuits, the system reaction is in accordance with the system reaction described for system 1b (FIG. 2).

If an interruption is present in the bus system HS-CAN between the input unit 10 and the smart switch 30 or the gearbox 20, this has the result that the control unit 20 or 30, of which the bus system connection HS-CAN to the input unit 10 is not interrupted and which thus receives control signals in accordance with the driver request for parking brake, controls the coupling relay 120 so that said relay closes. Therefore, the other control unit 20 or 30 also receives via the additional bus system connection the driver request for parking brake which is sent from the input unit 10. Consequently, in each case the right actuator 60 and the left actuator 50 are controlled so that they are applied.

If the bus system HS-CAN to the gearbox 20 and to the smart switch 30 is interrupted, both actuators 50, 60 are nevertheless applied when a driver request for parking brake is present. This is effected either by the logic in the gearbox 20 or the logic in the smart switch 30. The control unit 20 or 30 with the executing logic controls the coupling relay 120 so that said relay closes and thus the additional bus system connection is open. The executing logic thus controls both actuators 50, 60 so that they are applied in accordance with the driver request for braking.

In the event of failure of the bus system HS-CAN with a short-circuit, the system reaction is analogous to the system reaction to the single fault described in the previous paragraph.

If the single fault is a failure of the bus system connection Private-CAN between gearbox 20 and right actuator 60 or between smart switch 30 and left actuator 50, the left actuator 50 or the right actuator 60 is applied in accordance with the driver request for braking. The system reaction corresponds to the system reaction of system 1b to the single fault present. Both actuators 50, 60 are not applied, since a blocked coupling relay 120 is assumed.

If a short-circuit is present in the bus system connection Private-CAN between gearbox 20 and right actuator 60, this single fault causes the same system reaction as the failure of the bus system connection Private-CAN in this region.

In contrast, a short-circuit in the bus system connection Private-CAN between smart switch 30 and left actuator 50 causes the same system reaction as the failure of the bus system connection Private-CAN between the smart switch 30 and the left actuator 50.

If the smart switch 30 fails, the right actuator 60 is controlled via the gearbox 20 in accordance with the driver request for parking brake, so that said actuator is applied. In addition, the coupling relay 120 is controlled by the gearbox 20 so that said relay closes, whereby the control signals of the gearbox 20 also control the left actuator 50 so that said actuator is applied.

In the event of failure of the gearbox 20, in contrast, the left actuator 50 is applied in response to control signals of the smart switch 30 in accordance with the driver request for parking brake. The smart switch 30 controls the coupling relay 120 so that said relay closes. Via the additional bus system connection Private-CAN, the right actuator 60 is also controlled by the control signals of the smart switch 30 in accordance with the driver request for parking brake.

If the failure of an actuator 50 or 60 is present, the system reaction is analogous to the system reaction of system 1b from FIG. 2 to this single fault.

Figure 5:
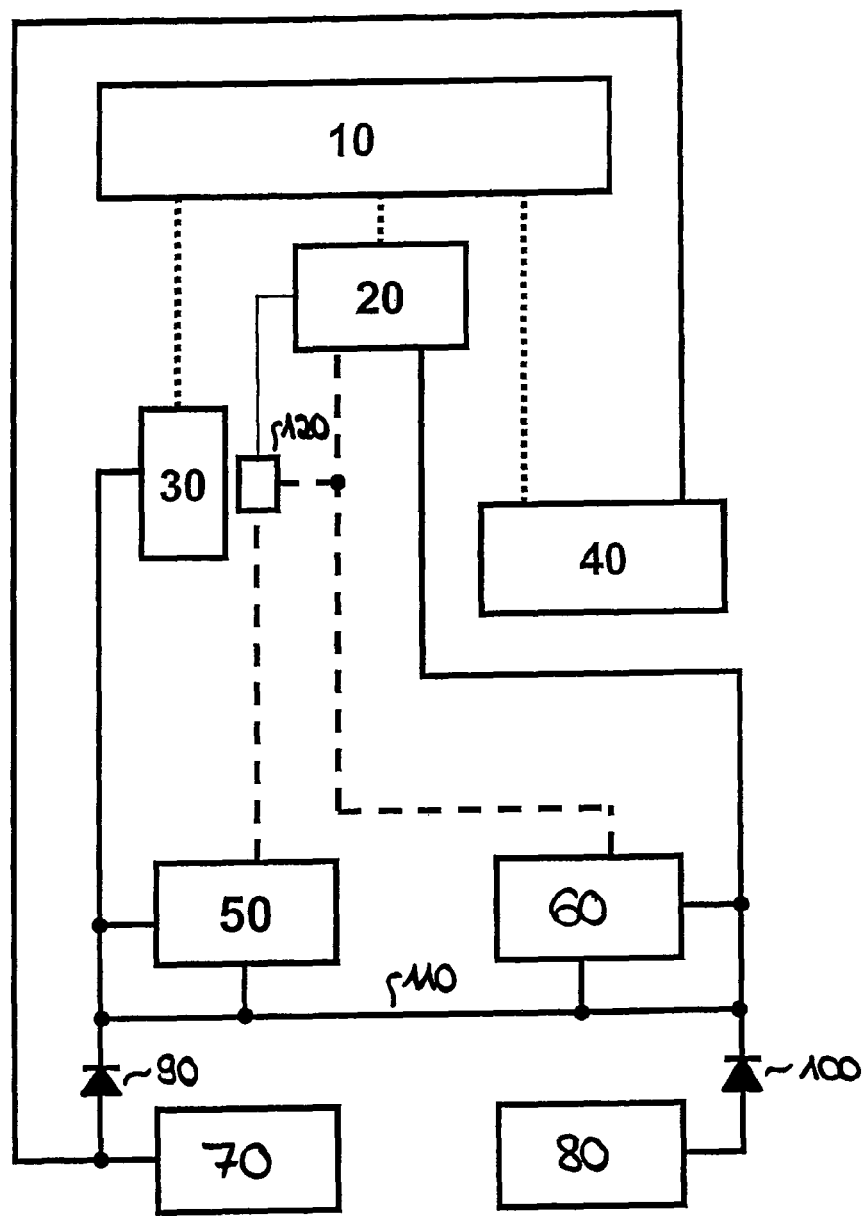
FIG. 5 shows a circuit diagram of a fifth embodiment of the electronic system.

FIG. 5 shows a circuit diagram of an electronic system 4. The circuit diagram corresponds substantially to the circuit diagram with respect to system 2 from FIG. 3. The difference lies in the fact that the bus system connections Private-CAN between the smart switch 30 and the left actuator 50, as well as between the gearbox 20 and the right actuator 60, are connected via an additional bus system connection Private-CAN, this additional bus system connection Private-CAN comprising a coupling relay 120. The coupling relay 120 is controlled independently by the smart switch 30 and the gearbox 20.

The coupling relay 120 can be switched between two states, a closed state in which the additional bus system connection is used for transmitting control signals, and a blocked state in which the coupling relay 120 is open and no control signal transmission is possible via the additional bus system connection. Initially, the coupling relay 120 is open and thus the system 4 with blocked coupling relay 120 corresponds to the system 2 from FIG. 3.

In fault-free system operation and even in the event of failure of one of the control units smart switch 30 and gearbox 20, in the event of failure of the bus system HS-CAN or in the event of failure of one of the two voltage sources 70, 80, both actuators 50, 60 can be applied. In the event of a short-circuit in the coupling branch 110, no system reaction is possible.

If, however, one of the other single faults from the set of fault states in the system 4 is present, at least one actuator 50, 60 is also applied in the system from FIG. 5.

In the event of failure of the left voltage source 70, the ESP 40 no longer receives any control signals from the input unit 10. The energy supply for both actuators 50, 60 as well as for the smart switch 30 and the gearbox 20 is ensured by the right voltage source 80. Either the smart switch 30 or the gearbox 20 control the coupling relay 120 so that said relay closes. The control unit 20 or 30 controlling the coupling relay controls both actuators 50, 60 in accordance with the driver request for braking so that said actuators are applied.

In the event of failure of the right voltage source 80, the energy supply for both actuators 50, 60 as well as for the smart switch 30, the ESP 40 and the gearbox 20 is ensured by the left voltage source 70. The further system reaction is analogous to the system reaction described in the previous paragraph.

If a short-circuit is present in one of the two energy supply circuits connected to the coupling branch 110, the system reaction is in accordance with the system reaction to one of the two single faults already described with regard to system 4, a short-circuit in the left energy supply circuit causing the same system reaction as in the event of failure of the left voltage source 70 and a short-circuit in the right energy supply circuit causing the same system reaction as in the event of failure of the right voltage source 80.

The single fault descriptions and system reactions which are still missing are analogous to the description of the faults for system 3 from FIG. 4 and are therefore not explicitly set out again.

Since system 4 (FIG. 5) comprises a coupling branch 110, the single fault "short-circuit in the coupling branch" is also significant for this system 4. If a short-circuit is thus present in the coupling branch 110, both actuators 50, 60 are no longer supplied with energy, no more control signals can be received and therefore both actuators 50, 60 cannot activate the parking brake. In the case of this fault, there is thus no longer any system reaction.

Figure 6:
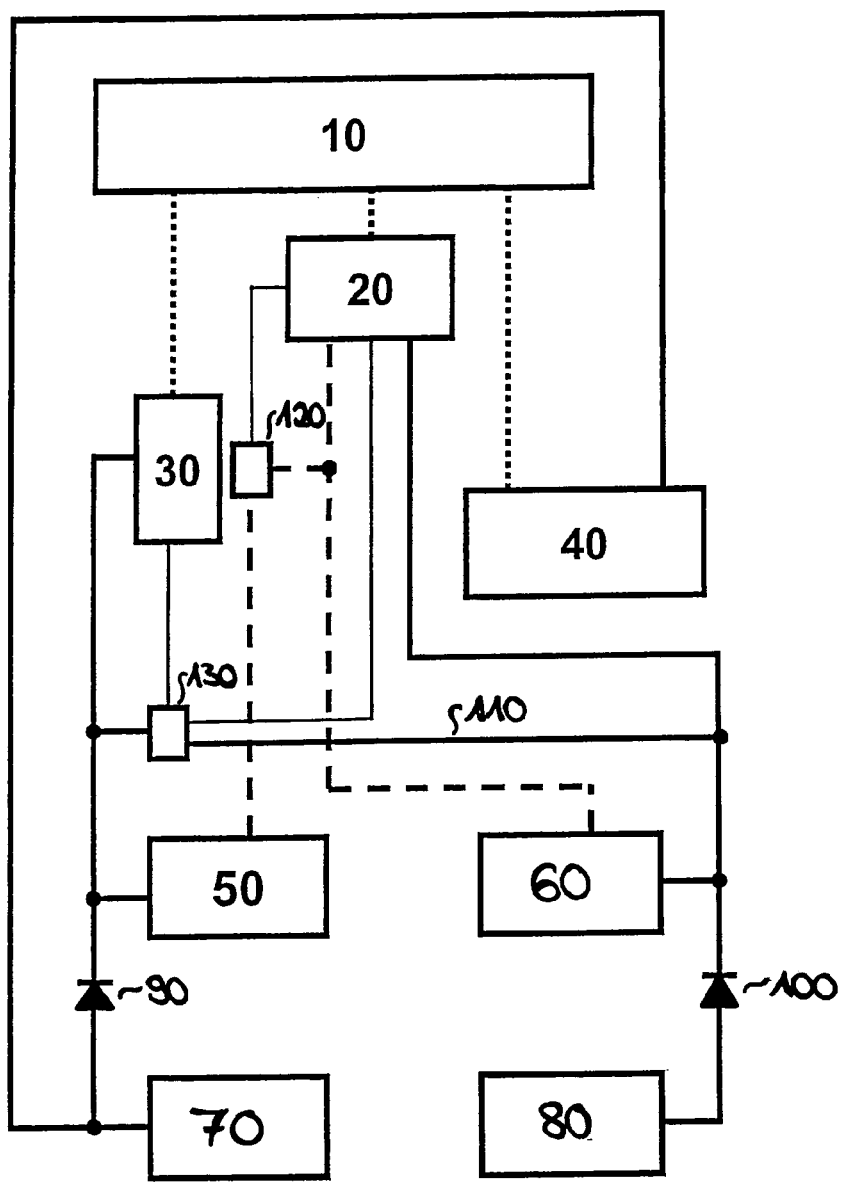
FIG. 6 shows a circuit diagram of a sixth embodiment of the electronic system.

FIG. 6 shows a circuit diagram of an electronic system 5. The circuit diagram corresponds substantially to the circuit diagram with respect to system 4 from FIG. 5. The difference lies in the fact that a coupling relay 130 is arranged in the coupling branch 110.

The coupling relay 130 can be switched between two states, a closed state in which the coupling branch 110 unites the two energy supply circuits, and a blocked state in which the coupling relay 130 is open and no energy transmission is possible via the coupling branch 110. Initially, the coupling relay 130 is open and thus the system 5 with blocked coupling relay 130 corresponds to the system 3 from FIG. 4.

In fault-free system operation and even in the event of failure of one of the control units smart switch 30 and gearbox 20, in the event of failure of the bus system HS-CAN or in the event of failure of one of the two voltage sources 70, 80, both actuators 50, 60 can be applied. In the event of a short-circuit in the coupling branch 110, at least one actuator 50, 60 can be applied in this system 5.

If one of the other single faults from the set of fault states in the system 5 is present, at least one actuator 50, 60 is also applied in the system from FIG. 6.

In the event of failure of the left voltage source 70, the gearbox 20 controls the coupling relay 130 in the coupling branch 110 so that said relay closes. The energy supply for the actuator 50 and the smart switch 30 is now also ensured by the right voltage source 80. Either the smart switch 30 or the gearbox 20 control the coupling relay 120 so that said relay closes. The control unit 20 or 30 controlling the coupling relay controls both actuators 50, 60 in accordance with the driver request for braking so that said actuators are applied.

In the event of failure of the right voltage source 80, the smart switch 30 controls the coupling relay 130 in the coupling branch 110 so that said relay closes. The energy supply for the actuator 60 and the gearbox 20 is now also ensured by the left voltage source 70. The further system reaction is analogous to the system reaction described in the previous paragraph.

If a short-circuit is present in one of the two energy supply circuits, the system reaction for a short-circuit in the energy supply circuit fed from the left voltage source 70 is analogous to the system reaction to the failure of the left voltage source 70 with regard to system 5. For a short-circuit in the energy supply circuit fed from the right voltage source 80, the system reaction is analogous to the system reaction to the failure of the right voltage source 80 with regard to system 5.

The single fault descriptions and system reactions which are still missing are analogous to the description of the faults for system 3 from FIG. 4 and are therefore not explicitly set out again.

Since system 5 (FIG. 6) comprises a coupling branch 110, the single fault "short-circuit in the coupling branch" is also significant for this system 5. If a short-circuit is thus present in the coupling branch 110, said short-circuit affects only one of the two power supply circuits, since an open coupling relay 130 is assumed. The system reaction corresponds to the system reaction to one of the two single errors "failure of the left voltage source 70" and "failure of the right voltage source 80", a short-circuit in the left energy supply circuit causing the same system reaction as in the event of failure of the left voltage source 70 in the system 3 (FIG. 4) and a short-circuit in the right energy supply circuit causing the same system reaction as in the event of failure of the right voltage source 80 in the system 3 (FIG. 4), since the open coupling relay 120 in the additional bus system connection Private-CAN is also assumed.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. An electronic system to operate an electromechanical parking brake for a land vehicle, the system comprising:
   at least one input unit to detect a driver request for parking brake;
   at least two separate control units in connection with the input unit to evaluate the driver request for parking brake transmitted to the input unit;
   at least two actuators for activating the parking brake with each one of the actuators connected to one of the control units, each of the control units being operable to control a corresponding actuator; and
   an energy supply to feed the input unit, the control units and the at least two actuators, the system being operative, on occurrence of a single fault from a set of possible faults in the system, to supply at least one control unit and at least one actuator with energy and with the at least one supplied control unit being operative to control the at least one supplied actuator so that the land vehicle is fixed in a parked position when a corresponding driver request for parking brake is present.

2. The system according to claim 1, wherein the energy supply has at least two mutually independent voltage sources.

3. The system according to claim 1, wherein the energy supply has at least two mutually independent energy supply circuits each fed from at least one voltage source.

4. The system according to claim 3, wherein the at least one input unit supplies at least one of the control units with control signals via a first bus system.

5. The system according to claim 4, wherein the at least one least one of the control units supplies at least one actuator with control signals via a second bus system.

6. The system according to claim 5 further including at least one coupler.

7. The system according to claim 5 further including at least one coupler in the second bus system.

8. The system according to claim 5, wherein the two energy supply circuits of the energy supply are connected via a coupling branch.

9. The system according to claim 8 further including at least one coupler in the coupling branch.

10. The system according to claim 9 wherein the coupler in the coupling branch can be switched between two states, an open state and a blocked state in which the coupler separates the two energy supply circuits.

11. The system according to claim 10, wherein the set of fault states possible in the system includes:
   failure of a voltage source;
   short-circuit in the coupling branch;
   failure of the first bus system with interruption to at least one control unit;
   failure of the second bus system with interruption to a control unit;
   failure of a control unit; and
   failure of an actuator.

* * * * *